United States Patent [19]
Brulhet

[11] 4,260,563
[45] Apr. 7, 1981

[54] APPARATUS INCLUDING A VENTURI FOR REMOVING IMPURITIES FROM A GASEOUS MIXTURE

[75] Inventor: Paul Brulhet, Nilvange, France

[73] Assignee: Societe Sacilor, Acieries et Laminoirs de Lorraine, Hayange, France

[21] Appl. No.: 3,033

[22] Filed: Jan. 12, 1979

Related U.S. Application Data

[63] Continuation of Ser. No. 819,115, Jul. 26, 1977, abandoned.

[30] Foreign Application Priority Data

Jul. 28, 1976 [FR] France .................. 76 22924

[51] Int. Cl.³ .................. B01D 47/10; B05B 1/26
[52] U.S. Cl. .................. 261/23 R; 261/64 B; 261/62; 261/69 R; 261/115; 261/DIG. 54; 261/DIG. 56; 55/225; 55/314; 55/344; 55/226; 239/545
[58] Field of Search .................. 55/224–227, 55/230, 270, 312, 314, 344; 261/78 A, 115, DIG. 54, DIG. 56, 62, 69 R, 23 R, 64 B; 239/545; 38/45, 46

[56] References Cited

U.S. PATENT DOCUMENTS

| | | | |
|---|---|---|---|
| 629,181 | 7/1899 | Ulbrich | 239/545 |
| 662,509 | 11/1900 | Van den Broek | 261/115 |
| 2,597,442 | 5/1952 | Wood | 261/78 A |
| 2,702,699 | 2/1955 | Kinney | 261/69 R |
| 3,116,348 | 12/1963 | Walker | 261/DIG. 54 |
| 3,167,413 | 1/1965 | Kiekens et al. | 55/227 |
| 3,350,076 | 10/1967 | Crommelin, Jr. | 261/DIG. 54 |
| 3,544,086 | 12/1970 | Willett et al. | 261/62 |
| 3,616,613 | 11/1971 | Loquewz et al. | 55/227 |
| 3,648,440 | 3/1972 | Egan | 55/226 |
| 3,726,065 | 5/1973 | Hausberg et al. | 55/344 |
| 3,768,234 | 10/1973 | Hardison | 55/226 |
| 3,791,633 | 2/1974 | Lowe | 261/118 |
| 4,002,293 | 1/1977 | Simmons | 239/545 |
| 4,080,183 | 3/1978 | Schminke | 55/226 |
| 4,118,444 | 10/1978 | Abbey | 261/DIG. 56 |

FOREIGN PATENT DOCUMENTS

| | | | |
|---|---|---|---|
| 1090810 | 4/1955 | France | 261/DIG. 54 |
| 1318960 | 11/1964 | France | 261/DIG. 54 |
| 2197627 | 3/1974 | France | 55/226 |
| 42-1677 | 6/1967 | Japan | 55/230 |
| 46-5117 | 8/1971 | Japan | 55/227 |
| 17369 | of 1892 | United Kingdom | 239/545 |
| 736210 | 9/1955 | United Kingdom | 261/115 |
| 288883 | 12/1970 | U.S.S.R. | 55/227 |
| 341508 | 7/1972 | U.S.S.R. | 55/227 |
| 371959 | 5/1973 | U.S.S.R. | 55/225 |

Primary Examiner—David L. Lacey
Attorney, Agent, or Firm—Laubscher & Laubscher

[57] ABSTRACT

A purifying system is disclosed for the removal of small particles of impurities from a gaseous mixture flowing in a conduit, including a venturi connected in series in the conduit, a liquid injection device for introducing jets of liquid to produce a liquid mist pattern extending transversely within the venturi to moisturize the small particles of impurities, and a regulator operable in response to the pressure differential across the venturi for adjusting the effective cross-section of the venturi and/or the operation of the injection device, thereby to maintain the pressure differential across the venturi at a predetermined value.

2 Claims, 11 Drawing Figures

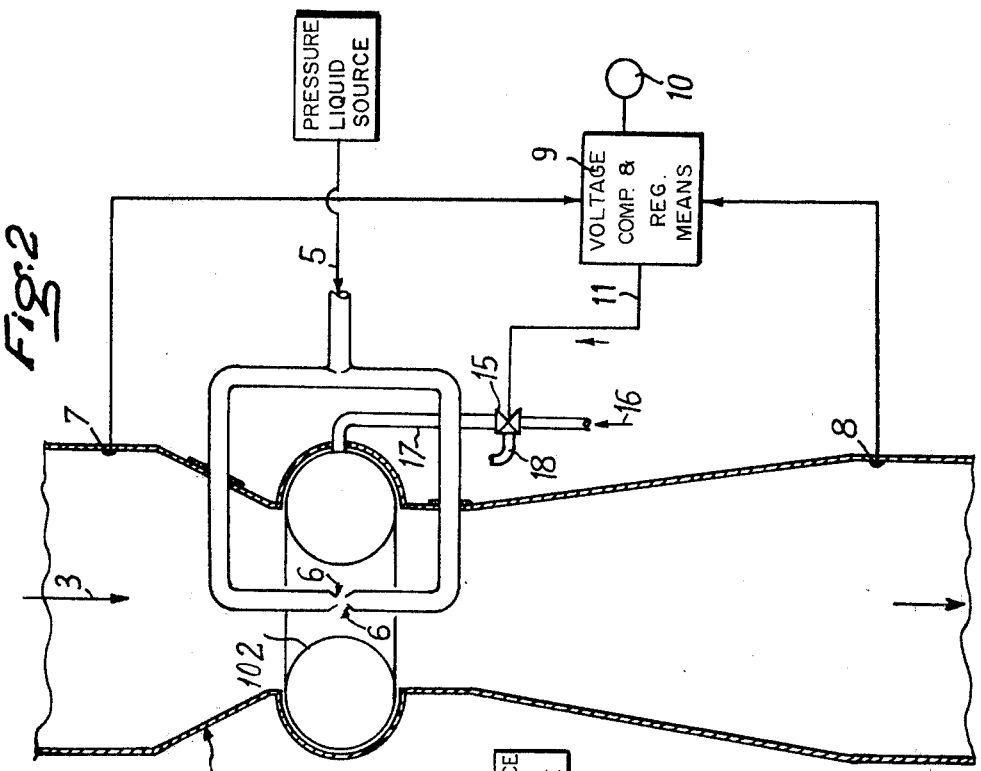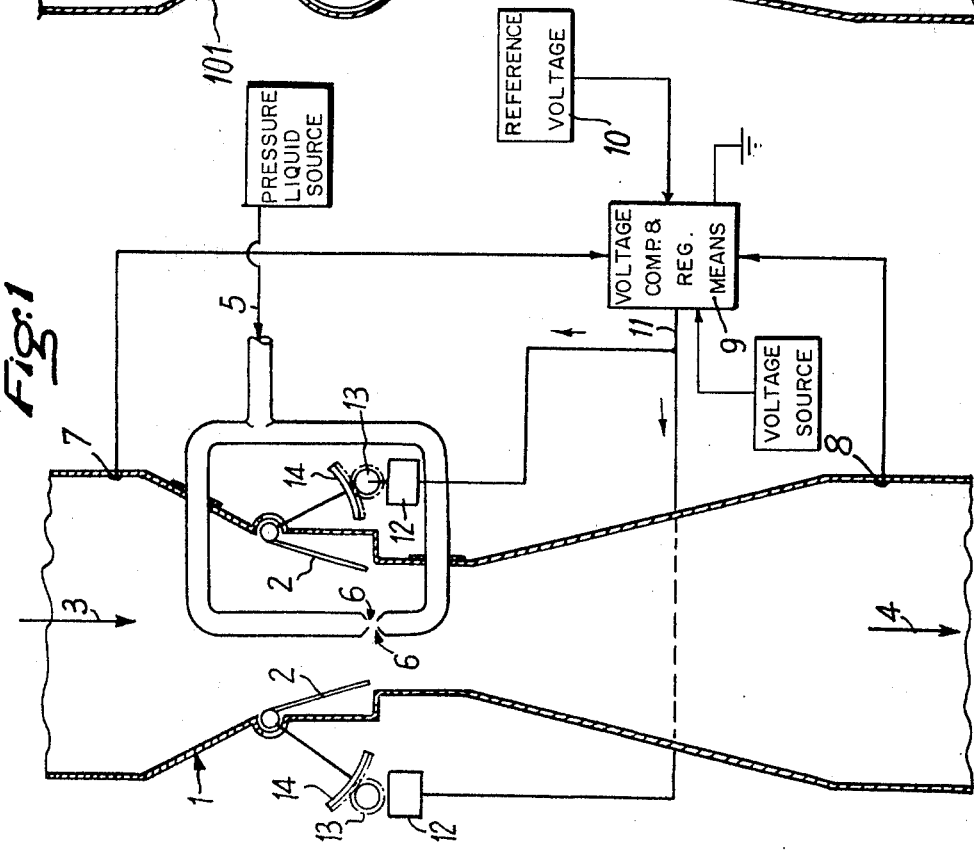

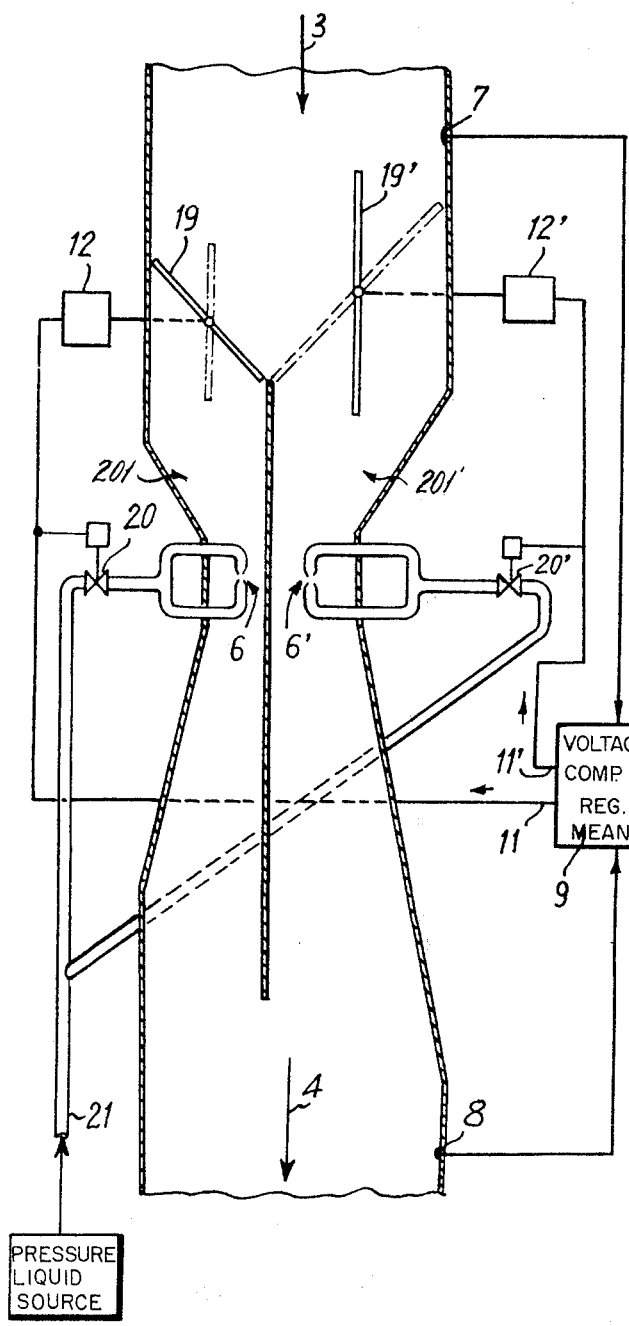
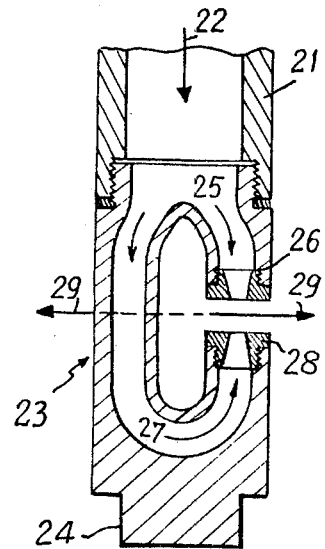
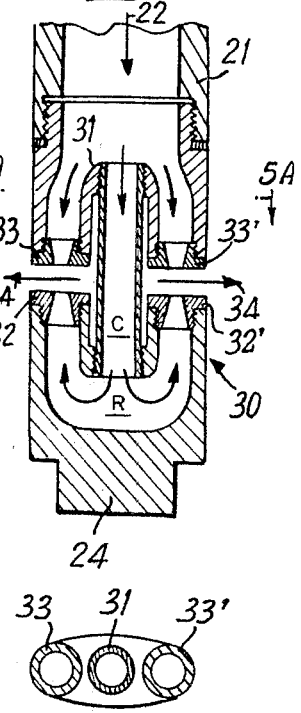

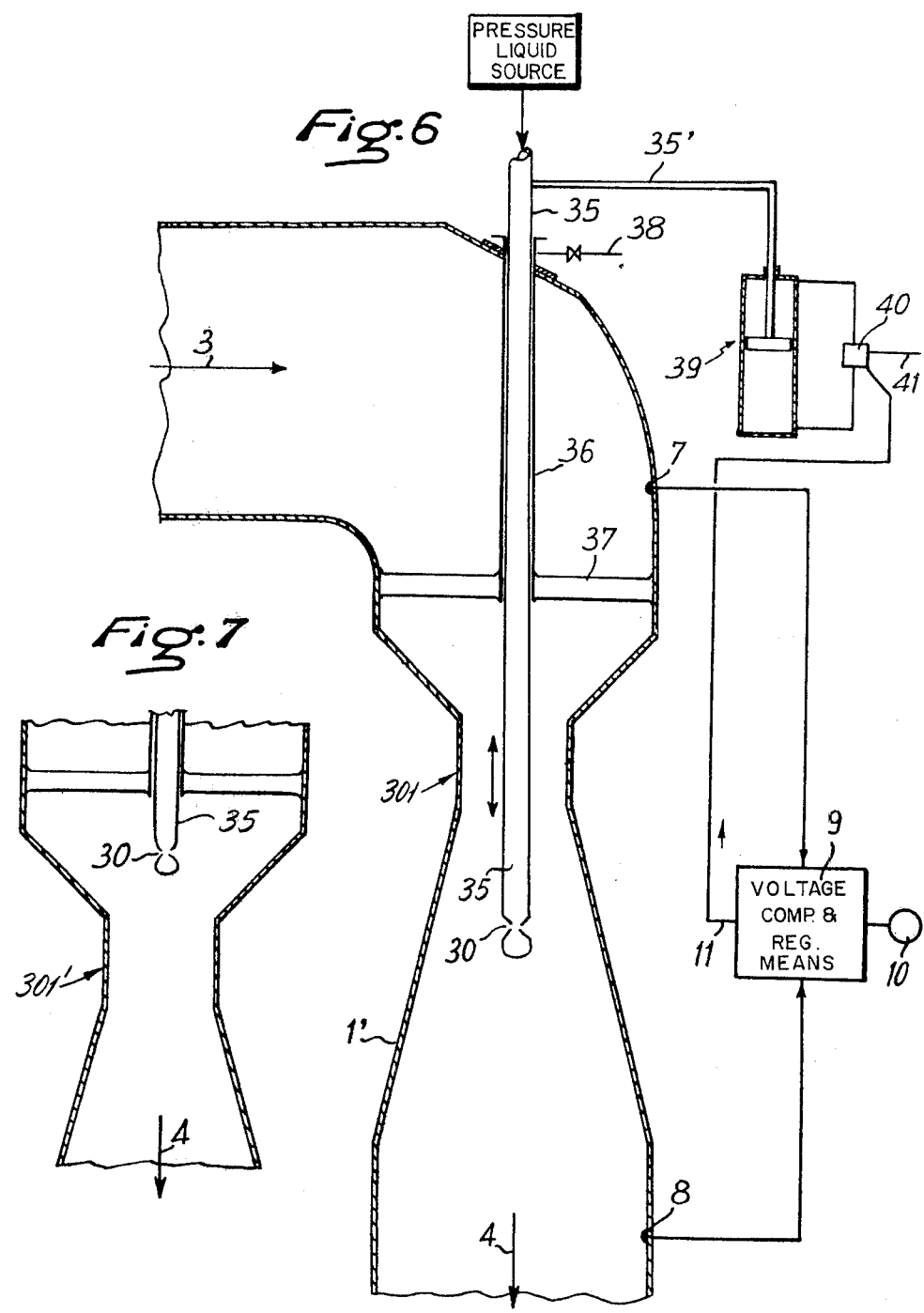

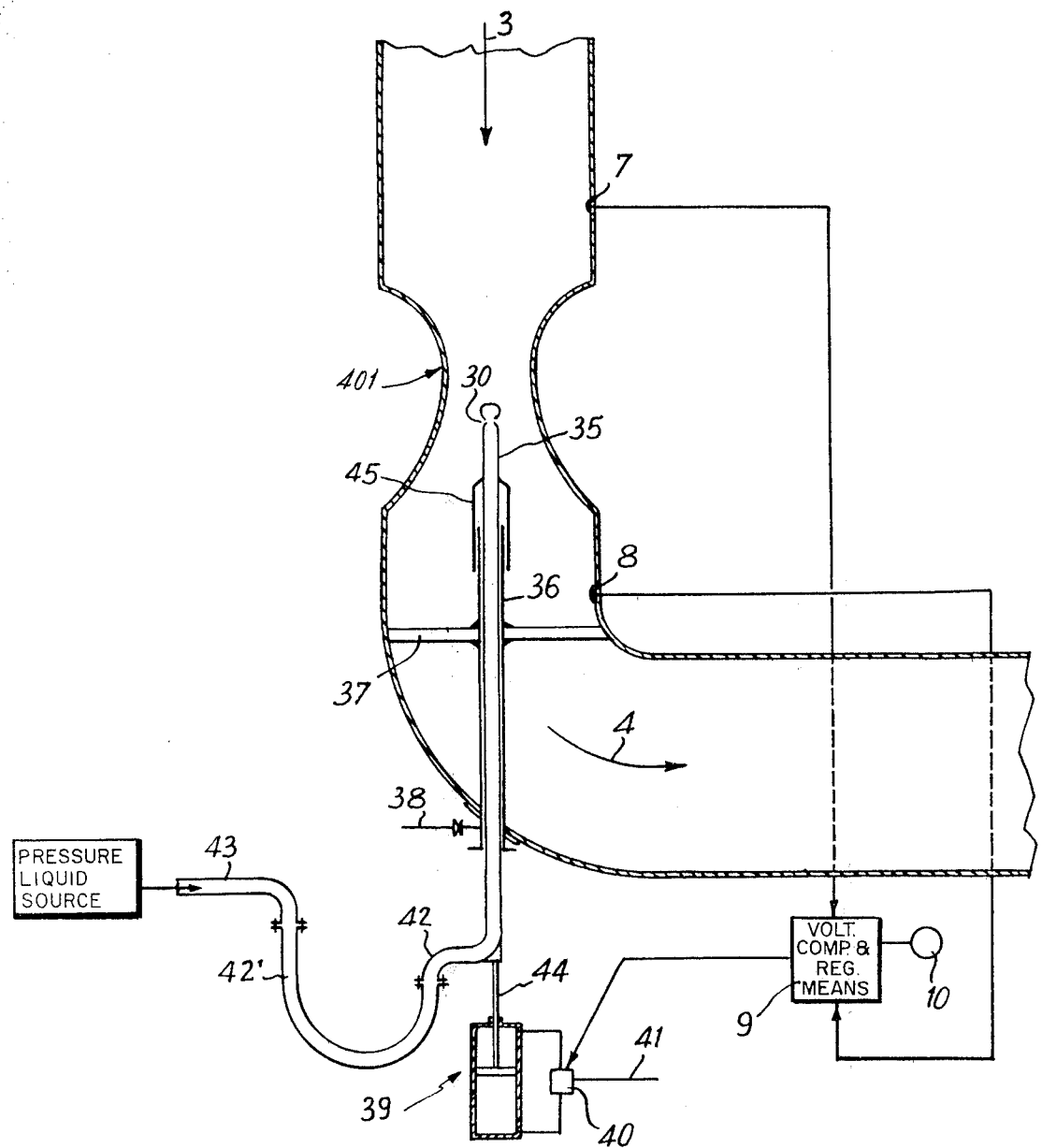

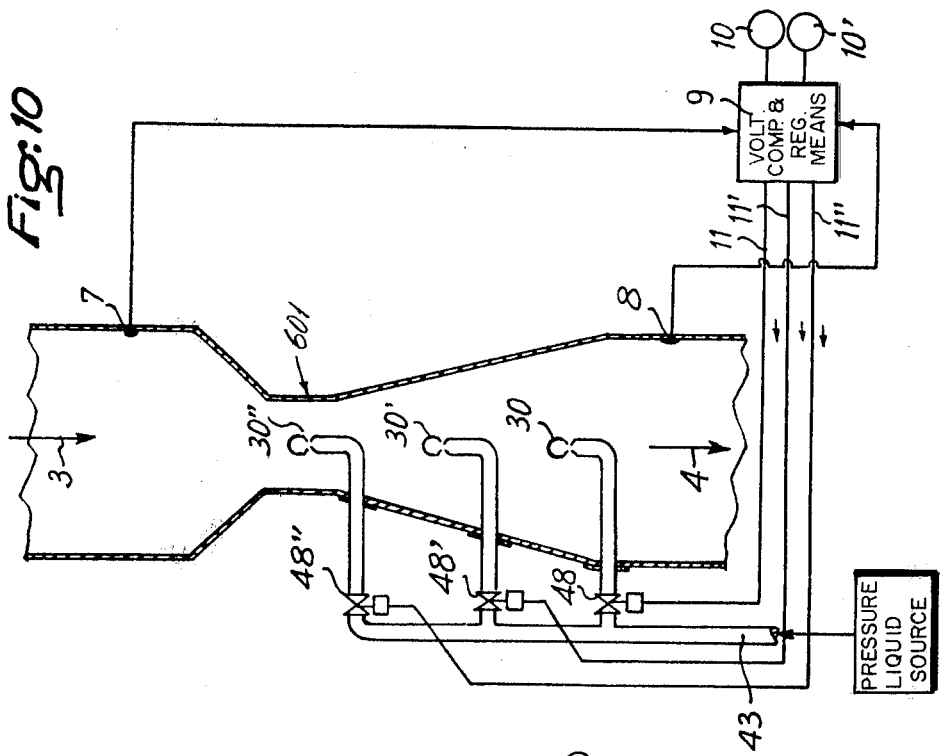
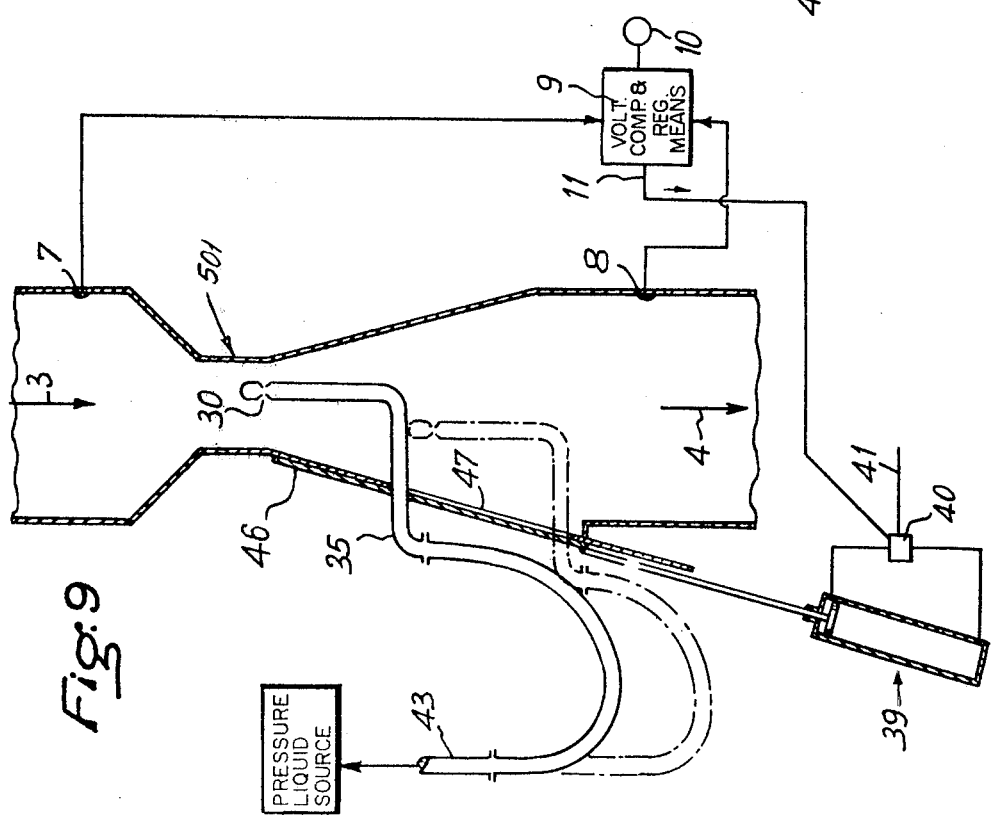

APPARATUS INCLUDING A VENTURI FOR REMOVING IMPURITIES FROM A GASEOUS MIXTURE

This is a continuation of application Ser. No. 819,115 filed July 26, 1977, now abandoned.

BRIEF DESCRIPTION OF THE PRIOR ART

Various proposals have been made in the patented prior art for introducing liquid sprays in a conduit to create a mist through which a gaseous mixture flows, thereby to moisturize or wash the particles of impurities for the removal thereof from the gaseous mixture. Examples of these known moistening systems for purifying gaseous streams are disclosed in the U.S. Pat. Nos. to Mitchell 1,620,826, Schwender 1,827,768, Wickland 2,688,943, the British Pat. Nos. 190,373 and 149,340, the Swiss Pat. No. 87,018, and the German Pat. Nos. 225,325, 816,105 and 603,398, among others.

In my U.S. application Ser. No. 594,548 filed July 9, 1975 (now abandoned), an improved purification system is disclosed for removing small particles of impurities (of a size less than about $1\mu$) from a gaseous mixture, characterized by the provision of a pair of closely spaced opposed nozzles arranged longitudinally in the gaseous mixture conduit for directing in opposition a pair of non-atomized liquid jets that are continuous to their point of engagement, thereby to establish a generally planar liquid mist pattern that extends transversely of the gas mixture conduit. The gaseous mixture passes through the liquid mist pattern, thereby to moisturize the fine particles of impurities having a size less than about $1\mu$.

As distinguished from the systems of the prior art wherein the liquids are sprayed (for example, in a conical spray pattern) prior to engagement with each other, in my previously disclosed method use is made only of the pressure energy of the liquid to produce the liquid mist. As a consequence of this improvement, for a comparable purification yield, the flow velocity of the gaseous mixture (smoke, for example) is several times less than that for methods involving pneumatic pulverization (or dispersion of the liquid into a spray) prior to contact of the opposed sprays.

However, for a given dust particle content, and with a given dust grain size, the efficiency of purification diminishes abruptly when the flow velocity of the gaseous mixture or smoke drops below a certain value; that is, for a given conduit cross-section, below a certain pressure differential between the upstream and downstream sections relative to the position of water injection.

SUMMARY OF THE INVENTION

The present invention was developed to avoid the above and other drawbacks of the previously known purification systems, so as to maintain the purification efficiency constant when the gas or smoke flow rate varies during the course of the industrial process, while consuming a minimum amount of energy necessary for the purification of the gas or smoke.

Accordingly, a primary object of the present invention is to provide an improved purifying system including, in combination, a venturi connected in series in the gaseous mixture conduit, liquid injection means for injecting opposed liquid jets in the venturi to establish a liquid mist pattern that extends transversely across the venturi, and regulating means responsive to the pressure differential across the venturi for regulating the effective size of the venturi and/or the operation of the liquid injection means, thereby to maintain the pressure differential at a predetermined value so that the dust particle yield is substantially constant regardless of the flow velocity of the gaseous mixture. In one embodiment, the effective cross-section of the venturi means is regulated as a function of the pressure differential of the gaseous medium across the venturi means, the venturi either including mechanically adjustable side wall sections, or an inflatable annular member arranged concentrically within the venturi. Furthermore, in accordance with another modification of this embodiment, a pair of venturi means of unequal cross-section may be connected in parallel, each of said venturi means having associated therewith a liquid injection device, the regulating means being operable to selectively control the venturi means and/or the liquid injection means associated therewith. In a second embodiment, means operable by the regulating means are provided for adjusting the position of the liquid injection means longitudinally of the venturi means. In one modification, a plurality of longitudinally arranged liquid injection means are selectively operable by the regulating means to maintain the predetermined pressure differential across the venturi means. In another modification, the liquid injector means is mounted on one end of a support tube that in turn is mounted for displacement relative to the venturi means, one of the liquid jet nozzles of the injection means being fed with liquid directly from the conduit, and the other liquid jet nozzle being fed with liquid from the support tube via a 180° reversing passage.

BRIEF DESCRIPTION OF THE DRAWING

Other objects and advantages of the invention will become apparent from a study of the following specification when viewed in the light of the accompanying drawing, in which:

FIG. 1 is a cross-sectional view of a first embodiment of the invention including venturi means having a variable cross-section;

FIG. 2 is a cross-sectional view of a modification of the invention of FIG. 1 including an inflatable member for controlling the effective cross-section of the venturi means;

FIG. 3 is a cross-sectional view of a modification of the invention including a pair of venturi means of different cross-sections connected in parallel in the gaseous mixture conduit;

FIG. 4 is a detailed sectional view of the opposed liquid jet means arranged at the end of a liquid supply support tube for injecting liquid into the venturi means;

FIG. 5 is a modification of the liquid injection means of FIG. 4 including two pairs of opposed jets mounted at one end of the liquid supply support tube;

FIG. 5A is a sectional view taken along line 5A—5A of FIG. 5;

FIG. 6 is a sectional view of a second embodiment of the invention wherein the liquid injection means are longitudinally displaceable relative to the venturi means;

FIG. 7 is a detailed sectional view of the apparatus of FIG. 6 with the liquid injection means positioned on the upstream side of the venturi means;

FIG. 8 is a sectional view of a modification of the apparatus of FIG. 6, the liquid injection means being supported from the downstream side of the venturi means;

FIG. 9 is a sectional view of a modification of the apparatus of FIG. 8; and

FIG. 10 is a sectional view of a further modification including a plurality of selectively operable liquid injection means.

DETAILED DESCRIPTION

Referring first more particularly to the embodiment of FIG. 1, the venturi means 1 is connected in series in the conduit having a gaseous mixture flow in the direction indicated by arrows 3 and 4, said venturi means including a pair of opposed pivotally adjustable wall panels or plates 2 that are adjustable to vary the effective cross-sectional area of the venturi means. Liquid is supplied from a pressure liquid source as shown by the arrow 5, to a pair of opposed closely spaced liquid jets 6 for establishing a generally planar liquid mist pattern that extends transversely across the venturi means for moisturizing (or washing) the small particles of impurities contained in the gaseous mixture.

In accordance with a characterizing feature of the invention, pressure-responsive means are provided including electrodes 7 and 8 (such as piezoelectric devices, for example) are mounted in openings contained in the conduit wall for measuring the upstream and downstream pressures, respectively, of the gaseous medium on opposite sides of the venturi means 1. The signals from these electrodes are supplied to voltage comparison and regulating means 9 which, in a conventional manner, integrates the two pressure responsive signals to produce a resultant signal that is compared with a reference signal provided by the reference voltage source 10. The voltage comparison and regulating means produces an output signal 11 that is simultaneously applied to venturi adjusting means including a pair of reversible electrical motors 12 that drive gearing means 13 and 14 to pivotally displace the venturi panels 2 toward or away from each other in accordance with the polarity (or phase) of the output signal 11, thereby to decrease or increase, respectively, the effective cross-sectional area of the venturi means 1.

OPERATION

In the event that the flow rate of the gaseous mixture decreases, the pressure differential across electrodes 7 and 8 decreases correspondingly, thereby reducing the resultant signal that is compared with the reference signal. An output signal 11 of a given magnitude and polarity is produced by the venturi adjusting means to cause the venturi panels 2 to be pivoted together to reduce the effective cross-sectional area of the venturi, whereupon the flow speed of the gaseous mixture increases to return the pressure drop across the venturi to be returned to the predetermined value. Consequently, by maintaining the pressure differential across the venturi to the predetermined value, a uniform constant moisturization of the small particles of impurities by the liquid injection means 6 will be achieved.

Referring now to the modification of FIG. 2, the venturi means 101 includes a concentrically arranged annular inflatable member 102 that is supplied with pressure fluid 16 such as air via a 3-way valve 15 and supply conduit 17. When the valve 15 is in one position, pressure fluid 16 is supplied to the inflatable member 102 to expand the same and thereby reduce the effective cross-section of the venturi means 101. When the valve 15 is in its other position, the inflatable member 102 is vented to atmosphere 18. The operation of the valve 15 is controlled by the output signal 11 from the voltage comparison and regulating means 9 as described above with regard to FIG. 1. Consequently, if the pressure differential between electrodes 7 and 8 increases, valve 15 is operated to vent the inflatable member 102 to atmosphere 18, whereupon the effective cross-section of the venturi means increases, and thereby reduces the pressure differential to the predetermined value as established by the reference voltage 10.

Referring now to the modification of FIG. 3, a pair of venturi means 201 and 201' of unequal cross-section are connected in parallel in the gaseous mixture conduit, each of the venturi means having associated therewith a butterfly valve 19, 19' that is operable by the reversible electric motor 12, 12', respectively. Furthermore, each venturi means is provided with a liquid injection means 6, 6' to which liquid from the supply conduit 21 is supplied via control valves 20, 20', respectively.

In operation, when the pressure differential between the upstream and downstream electrodes 7 and 8 is less than a predetermined value as established by the reference voltage sources 10 or 10', then output signal 11 serves to open valve 20 to actuate the liquid injection means 6, and to open butterfly valve 19, whereupon venturi means 201 is rendered operable. Similarly, output signal 11' serves to close valve 20' to deactivate the liquid injection means 6', and to operate motor 12' to close the butterfly valve 19', thereby rendering inoperable the larger venturi means 201'.

On the other hand, in the event that the pressure differential across the electrodes 7 and 8 increases, output signal 11 serves to close valve 20 and to close the butterfly valve 19, and output signal 11' serves to open valve 20' and to operate the reversible motor 12' to open the butterfly valve 19'. Similarly, if the pressure differential continues to exceed the predetermined value, valve 20 and butterfly valve 19 are caused to open, whereupon both venturi means 201 and 201' will be rendered operable. If the cross-section of venturi 201' is 50% greater than that of the venturi 201, the following adjustment steps are possible: 1 for venturi 201, 1.5 for venturi 201', and 2.5 for venturi means 201 and 201' simultaneously. The reference values 10 and 10' correspond with the switching of venturi 201 at or upon venturi 201' and of venturi 201' at or upon both venturi means 201 and 201'.

Referring now to FIG. 4, the liquid injection means 23 is mounted at one end of the liquid supply support tube 21 through which pressure liquid 22 is supplied, which injection means includes a pair of closely spaced opposed nozzles 26 and 28. Pressure fluid 22 is directly supplied to nozzle 26 via the direct passage 25, and liquid is supplied to the opposed nozzle 28 via the 180° reversely bent passage 27. Consequently, the opposed liquid jets—which are continuous and non-atomized up to their point of contact—produce the generally planar liquid mist pattern 29 that extends transversely across the venturi means in which the liquid injection device is mounted. In the modification of FIG. 5, the pressure liquid 22 is supplied directly to the first nozzles 33 and 33', and is supplied via the central passage C and the 180° reversely bent passage R to the opposed nozzles 32 and 32', respectively, thereby to produce the generally planar transversely extending spray mist pattern 34.

As illustrated in FIGS. 4 and 5, the components of the liquid injection means are screw threadably connected for simple disassembly without first having to dismantle the liquid supply support tube 21.

Referring now to the embodiment of FIG. 6, the support tube 35 upon the lower end of which is mounted the injection head 30 is connected at its other end with the source of pressure liquid, the support tube 35 being guided by stationary guide means 36 for axial displacement relative to the venturi means 301, whereby the position of the liquid injection means 30 relative to the venturi means 301 may be adjusted. To this end, the support tube 35 is connected by a lateral extension 35' to the piston element of a piston and cylinder motor 39 to the opposite ends of which is supplied pressure fluid from supply line 41 via reversing valve 40. In order to achieve the desired seal between the guide means 36 and the support tube 35, liquid such as washing water may be supplied from source 38 into the space between the support tube 35 and the guide sleeve 36. In operation, in the event that the pressure difference sensed by the electrodes 7 and 8 exceeds a predetermined value determined by the reference voltage 10, the output signal 11 from the voltage comparison and regulating means 9 closes valve 40 to operate to displace the piston of the piston motor means 39 upwardly whereupon the support tube 35 moves upwardly to cause the liquid injection means 30 to move toward the restricted neck portion of the venturi means 301. On the other hand, if the pressure difference between electrodes 7 and 8 increases above the predetermined value, valve 40 is operated to cause the piston of the piston cylinder motor 39 to move downwardly, whereupon the support tube 35 and the liquid injection means 30 are displaced downwardly relative to the restricted neck portion of the venturi means 301. Alternatively, as shown in FIG. 7, the liquid injection means 30 may be arranged upstream from the venturi means 301' for longitudinal displacement relative to the restricted neck portion thereof.

In the modification of FIG. 8, the venturi means 401 has convergent and divergent portions defined by a curvilinear generatrix, thereby to shorten the overall length of the venturi means. In this modification, the liquid supply support tube 35 is arranged downstream from the venturi means and is axially displaceable to longitudinally shift the position of the liquid injection means 30 relative to the venturi means 401. In this embodiment, a protective annular member 45 is connected with the support tube 35 about the upper end of the guide sleeve 36, thereby to prevent the same from being clogged by the dust particles which have been moistened by the liquid mist pattern produced by the liquid injection means 30.

Referring now to the modification of FIG. 9, the rigid liquid supply tube 35 for the liquid injection means 30 is mounted within an opening contained in a support plate 46 that is slidably displaceable longitudinally of the venturi means 501 by means of the piston-cylinder motor 39. Thus, the support tube 35 is slidably displaceable in the vertical groove 47 that is contained in the downstream divergent wall of the venturi means 501.

In the embodiment of FIG. 10, three liquid injection means 30, 30', 30" are rigidly mounted in stationary relation relative to the venturi means 601. Each of the liquid injection means is provided with a control valve 48, 48' and 48", respectively, for selectively controlling the supply of liquid from the liquid source 43 to the liquid injection means 30, 30', and 30". Thus, when the pressure differential between electrodes 7 and 8 is less than the predetermined value of reference numeral 10', the output signal 11" causes valve 48" to open, whereupon the liquid injection means 30" arranged in the constricted neck portion of the venturi means 601 is actuated. During this period of time the valves 48 and 48' remain closed to deactivate the liquid injection means 30 and 30', respectively. When the pressure differential is greater than the reference voltage 10', but less than the reference voltage 10, only the output signal 11' is present, whereupon control valve 48' is opened to activate the liquid injection means 30', but control valves 48 and 48" are closed to deactivate the liquid injection means 30 and 30". Finally, when the pressure differential between electrodes 7 and 8 is such that the resultant signal is greater than the reference voltage 10, only output signal 11 is present to open valve 48 to activate the liquid injection means 30, the remaining valves 48' and 48" being closed to deactivate the liquid injection means 30' and 30". As indicated in FIG. 10, injection means 30" is arranged within the constricted neck portion of the venturi means 601 and injection means 30' is placed at a position in which, at the point of ejection, the cross-sectional area of the venturi is about 50% greater than that of the neck portion. Finally, the liquid injection means 30 is arranged adjacent the downstream outlet of the venturi means 601.

In order to fully use all of the advantages of the invention the velocity of the water is so adjusted relative to the velocity of the gaseous mixture, that the resulting ratio is greater than 0.6, as disclosed in the aforementioned prior application Ser. No. 594,598. In a typical industrial installation, this adaptation is extremely complicated, and a source of potential breakdown. In reality, it would be necessary to vary the cross-section of the liquid injection means in the same direction as the cross-section of the venturi means at the water injection point. This is why, in practice, one can avoid using such a servo-system. Thus, the present invention affords the advantage of the possibility of maintaining constant particle removal efficiency in the apparatus while using minimum energy for dispersing the water into the form of a pulverized spray.

While in accordance with the Patent Statutes the preferred forms and embodiments of the invention have been illustrated and described, it will be apparent to those skilled in the art that modifications may be made without deviating from the inventive concepts set forth above.

What is claimed is:

1. Purifying apparatus for removing small particles of impurities from a gaseous mixture flowing in a conduit, comprising
   (a) venturi means connected in series in the conduit, said venturi means having a throat portion;
   (b) liquid injection means for introducing liquid into said venturi means to form a liquid mist pattern extending transversely across said venturi means, said liquid injection means including a plurality of injection heads (30, 30', 30") mounted in longitudinally spaced relation relative to the throat portion of said venturi means, each of said injections heads including a pair of opposed spaced adjacent nozzles arranged longitudinally of said venturi means;
   (c) means for generating an electrical output signal that is a function of the gas pressure differential across said venturi means, including
      (1) a pair of electrodes mounted in the conduit on opposite sides of said venturi means, (2) a reference voltage source, and (3) voltage comparison and regulating means connected with said electrodes and with said reference voltage source for producing a resultant signal that is compared with said reference voltage to produce an output signal for operating said venturi adjusting means, and (d) means responsive to said electrical output signal for operating selected ones of said injection heads to maintain the pressure differential at a predetermined value.

2. Purifying apparatus for removing small particles of impurities from a gaseous mixture flowing in a conduit comprising (a) a pair of venturi means (201, 201') connected in parallel in the conduit, said venturi means having effective cross-sectional areas of different size, respectively;

(b) a pair of butterfly members (19, 19') controlling the operation of said venturi means, respectively, each of said butterfly members being arranged adjacent and upstream from the associated venturi means and operable between closed and open positions;

(c) a pair of normally de-activated liquid injection means (6, 6') for introducing liquid into said venturi means, respectively, thereby to form liquid mist patterns extending across said venturi means respectively;

(d) means for generating an electrical output signal that is a function of the gas pressure differential across said venturi means, including (1) a pair of electrodes mounted in the conduit on opposite sides of the venturi means, (2) a reference voltage source, and (3) voltage comparison and regulating means connected with said electrodes and with said reference voltage source for producing a resultant signal that is compared with said reference voltage to produce an output signal for operating said venturi adjusting means; and (e) means responsive to said output signal for operating said butterfly members and said liquid injection means to maintain the pressure differential at a predetermined value.

* * * * *